US010509352B2

(12) United States Patent
Maruyama et al.

(10) Patent No.: US 10,509,352 B2
(45) Date of Patent: Dec. 17, 2019

(54) IMAGE FORMING SYSTEM, IMAGE FORMING APPARATUS, AND RECORDING MEDIUM CONFIGURED TO IMAGE BELONGINGS OF A USER AND ASSIST THE USER

(71) Applicant: KONICA MINOLTA, INC., Chiyoda-ku, Tokyo (JP)

(72) Inventors: Tomoko Maruyama, Toyokawa (JP); Kaoru Fukuoka, Toyokawa (JP); Hideyuki Matsuda, Hirakata (JP); Jun Shiraishi, Toyokawa (JP); Hiroyuki Ohno, Toyokawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/925,958

(22) Filed: Mar. 20, 2018

(65) Prior Publication Data
US 2018/0275576 A1    Sep. 27, 2018

(30) Foreign Application Priority Data

Mar. 22, 2017    (JP) .................................. 2017-056400

(51) Int. Cl.
*G03G 15/00*    (2006.01)
*H04N 1/00*    (2006.01)
(Continued)

(52) U.S. Cl.
CPC ........... *G03G 15/50* (2013.01); *G03G 15/205* (2013.01); *G03G 15/5012* (2013.01);
(Continued)

(58) Field of Classification Search
CPC .. G03G 15/50; G03G 15/553; G03G 15/5012; G03G 2215/00447; G03G 15/6508; G03G 15/5016; G03G 15/556; G03G 15/5091; G03G 15/0863; G03G 2215/0695; G03G 21/02; G03G 15/5066;
(Continued)

(56) References Cited

U.S. PATENT DOCUMENTS

| 2005/0078968 | A1* | 4/2005 | Ohta | G03G 15/5016 399/8 |
| 2008/0247773 | A1* | 10/2008 | Matsuura | G03G 21/04 399/84 |
| 2010/0272452 | A1* | 10/2010 | Tsukijima | G03G 15/553 399/27 |
| 2014/0104636 | A1* | 4/2014 | Baba | H04N 1/00323 358/1.14 |

(Continued)

FOREIGN PATENT DOCUMENTS

| JP | 06-080274 A | 3/1994 |
| JP | 2014089359 A * | 5/2014 |

*Primary Examiner* — David M. Gray
*Assistant Examiner* — Laura Roth
(74) *Attorney, Agent, or Firm* — Buchanan Ingersoll & Rooney PC

(57) ABSTRACT

When an image forming apparatus such as an MFP runs out of supplies, such as paper or toner, the user will need to load paper in the paper tray or replace the toner cartridge. However, the user occasionally has difficulty in opening the paper tray or the front cover because his/her hands are carrying the additional supplies. For example, the user may have to put the belonging down to open up the paper tray or the front cover. The image forming apparatus reacts to the user's desire in a mechanical manner by opening the paper tray or the front cover.

40 Claims, 13 Drawing Sheets

(51) Int. Cl.
*G06F 16/245* (2019.01)
*G03G 15/20* (2006.01)

(52) U.S. Cl.
CPC ......... *G03G 15/553* (2013.01); *G06F 16/245* (2019.01); *H04N 1/00251* (2013.01); *H04N 1/00543* (2013.01); *G03G 15/6508* (2013.01); *G03G 2215/00447* (2013.01); *H04N 2201/0094* (2013.01)

(58) Field of Classification Search
CPC .......... G03G 2215/00092; G03G 2215/00101; G03G 15/205; H04N 1/00543; H04N 1/00251; H04N 2201/0094; H04N 1/00925; H04N 1/00336; H04N 1/00832; G06F 17/30424
See application file for complete search history.

(56) References Cited

U.S. PATENT DOCUMENTS

| | | | |
|---|---|---|---|
| 2015/0055158 A1* | 2/2015 | Ogata | H04N 1/0035 |
| | | | 358/1.13 |
| 2016/0072915 A1* | 3/2016 | Decanne | G06F 17/30247 |
| | | | 715/728 |
| 2016/0330346 A1* | 11/2016 | Hayashi | H04N 1/442 |
| 2017/0257519 A1* | 9/2017 | Kuroishi | H04N 1/333 |
| 2017/0344651 A1* | 11/2017 | Ishido | G06F 16/9535 |
| 2018/0050800 A1* | 2/2018 | Boykin | H04N 5/23206 |
| 2018/0107441 A1* | 4/2018 | Aurongzeb | G06F 3/1423 |
| 2018/0203661 A1* | 7/2018 | Tamura | G06F 3/0481 |
| 2019/0025746 A1* | 1/2019 | Moriguchi | G03G 15/6502 |

\* cited by examiner

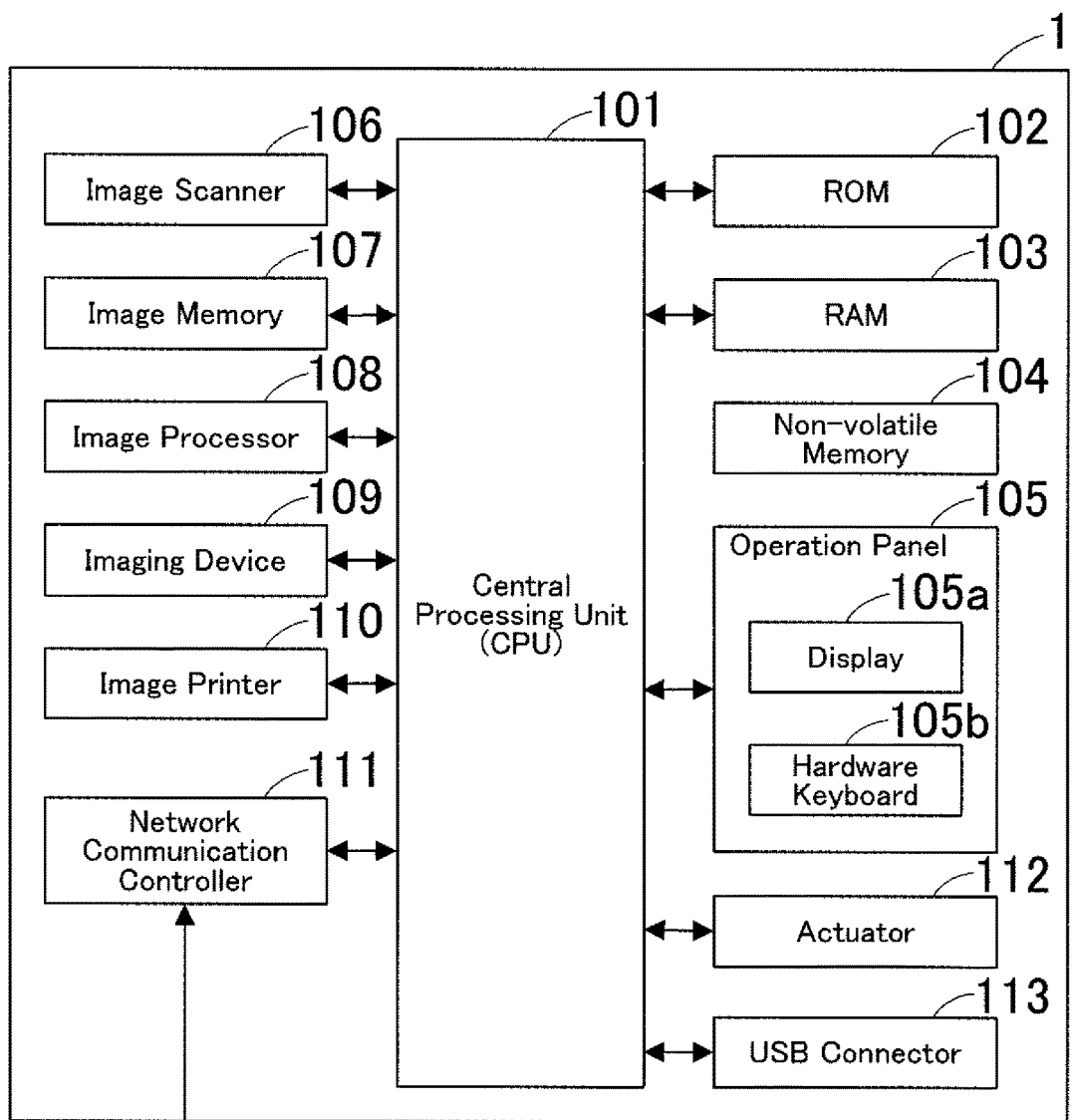
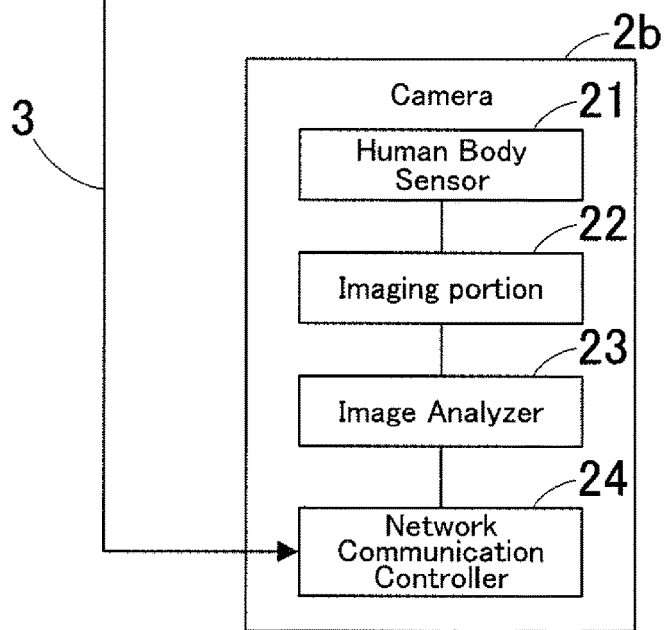
FIG.2

User Assistance Lookup Table

| Belonging | Target Member | User Assistance Action |
| --- | --- | --- |
| K toner cartridge | Front cover | Open cover |
| Y toner cartridge | Front cover | Open cover |
| M toner cartridge | Front cover | Open cover |
| C toner cartridge | Front cover | Open cover |
| K imaging unit | Front cover | Open cover |
| Y imaging unit | Front cover | Open cover |
| M imaging unit | Front cover | Open cover |
| C imaging unit | Front cover | Open cover |
| A3 paper | A3 paper tray | Eject tray |
| A4 paper | A4 paper tray (upper) | Eject tray |
| A4 paper | A4 paper tray (lower) | Eject tray |
| B4 paper | B4 paper tray | Eject tray |
| Document | Platen cover | Open cover |
| USB memory | Anti-dust cover | Open cover |
| ⋮ | ⋮ | ⋮ |

FIG.4

IMAGE FORMING SYSTEM, IMAGE FORMING APPARATUS, AND RECORDING MEDIUM CONFIGURED TO IMAGE BELONGINGS OF A USER AND ASSIST THE USER

The disclosure of Japanese Patent Application No. 2017-056400 filed on Mar. 22, 2017, including description, claims, drawings, and abstract, is incorporated herein by reference in its entirety.

BACKGROUND

Technological Field

The present invention relates to: an image forming system provided with a camera and an image forming apparatus such as a multi-function peripheral (MFP), i.e., a multifunctional digital machine; this image forming apparatus; and a recording medium.

Description of the Related Art

When an image forming apparatus such as an MFP as described above runs out of paper or toner, for example, the user will need to load paper in the paper tray or replace the toner cartridge. However, the user occasionally has difficulty in opening the paper tray or the front cover because his/her hands are so full of such a supply. That is, the user may have to put the belonging down on the floor to open up the paper tray or the front cover; or the user may have to remove an anti-dust connector cover, which is typically small, and then insert a USB flash drive into the USB port (connector) on the image forming apparatus.

In this case, it will be very convenient to the user if the image forming apparatus reacts to his/her desire in a mechanical manner by opening up the paper tray, the front cover, and the anti-dust connector over, for example.

Japanese Unexamined Patent Publication No. H06-080274 discloses a technique for a copier, which is ejecting a paper tray from the body of the copier in a mechanical manner by activating its paper tray actuator when its paper sensor senses the absence of paper in the paper tray.

The technique disclosed in Japanese Unexamined Patent Publication No. H06-080274 makes the paper tray actuator eject a paper tray in a mechanical manner only if the paper remaining in the paper tray runs out during a copy job. So, this technique does not solve the above-described problem: the user still has to open up the paper tray unless the paper remaining in the paper tray runs out.

SUMMARY

The present invention, which has been made in consideration of such a technical background as described above, is capable of reacting to the user's desire in a mechanical manner by opening up the paper tray, the front cover, and the anti-dust connector cover, for example, when the user carrying a belonging such as a supply is adjacent to the image forming apparatus.

A first aspect of the present invention relates to an image forming system including:
an image forming apparatus;
an imaging portion that performs imaging of a belonging of a user, the user being adjacent to the image forming apparatus;
a belonging analyzer that identifies the belonging by performing analysis on an image obtained by the imaging portion;
a memory that stores a user assistance lookup table, the user assistance lookup table including the following pieces of information specified in advance as one record: a belonging of a user; a user assistance action; and a target member of the image forming apparatus, the target member to be affected by the user assistance action;
a searcher that retrieves a user assistance action and target member both associated with the belonging identified by the belonging analyzer, by searching the user assistance lookup table for a record associated with the identified belonging, the user assistance lookup table being stored on the memory; and
a hardware processor that makes the image forming apparatus take the user assistance action retrieved by the searcher, by the target member retrieved by the searcher.

A second aspect of the present invention relates to an image forming apparatus, wherein:
analysis is performed on an image of a user being adjacent to the image forming apparatus, the image being obtained by an imaging portion, and a belonging of the user is identified; and
there is a memory inside or outside of the image forming apparatus, the memory storing a user assistance lookup table, the user assistance lookup table including the following pieces of information specified in advance as one record: a belonging of a user; a user assistance action; and a target member of the image forming apparatus, the target member to be affected by the user assistance action,
the image forming apparatus including:
a searcher that retrieves a user assistance action and target member both associated with the identified belonging, by searching the user assistance lookup table for a record associated with the identified belonging; and
a hardware processor that takes the user assistance action retrieved by the searcher, by the target member retrieved by the searcher.

A third aspect of the present invention relates to a non-transitory computer-readable recording medium storing a user assistance program for a computer of an image forming apparatus to execute processing, wherein:
analysis is performed on an image of a user being adjacent to the image forming apparatus, the image being obtained by an imaging portion, and a belonging of the user is identified; and
there is a memory inside or outside of the image forming apparatus, the memory storing a user assistance lookup table, the user assistance lookup table including the following pieces of information specified in advance as one record: a belonging of a user; a user assistance action; and a target member of the image forming apparatus, the target member to be affected by the user assistance action,
the user assistance program for the computer to execute:
retrieving a user assistance action and target member both associated with the identified belonging, by searching the user assistance lookup table for a record associated with the identified belonging; and
taking the retrieved user assistance action by the retrieved target member.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 2 is a block diagram illustrating an electrical configuration of an image forming apparatus and a camera;

FIG. 4 shows a user assistance lookup table;

DETAILED DESCRIPTION OF EMBODIMENTS

Hereinafter, one or more embodiments of the present invention will be described with reference to the drawings. However, the scope of the invention is not limited to the disclosed embodiments.

Figure 1:
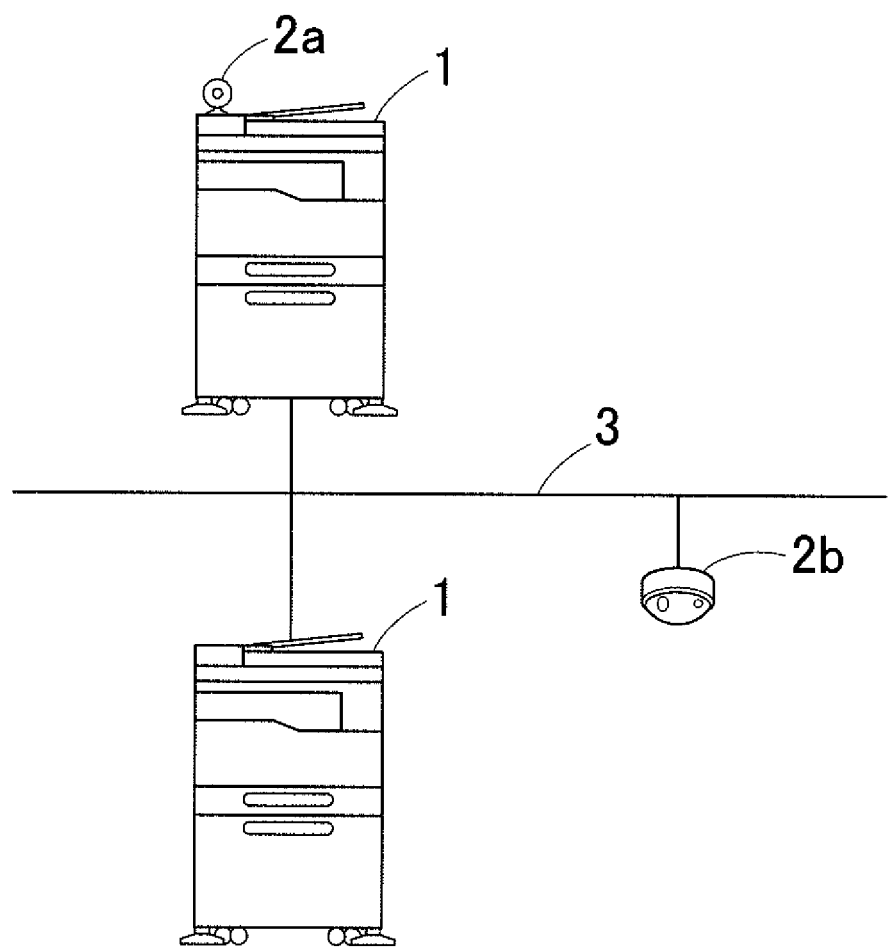
FIG. 1 illustrates a configuration of an image forming system having an image forming apparatus according to one embodiment of the present invention.

FIG. 1 illustrates a configuration of an image forming system having an image forming apparatus 1 according to one embodiment of the present invention. In this image forming system, the image forming apparatus 1 and a camera 2b are connected to each other through a network 3. Actually, the image forming apparatus 1 may be provided with the camera 2b; the image forming apparatus 1 and the camera 2b to be described below in the following embodiments, however, are provided independently of each other.

FIG. 2 is a block diagram illustrating an electrical configuration of the image forming apparatus 1 and the camera 2b. In this embodiment, an MFP i.e. a multi-functional digital machine having various functions such as a copier function, a printer function, a scanner function, and a facsimile function as described above, is employed as the image forming apparatus 1. Hereinafter, the image forming apparatus 1 will also be referred to as MFP 1.

The MFP 1 is provided with: a central processing unit (CPU) 101; a ROM 102; a RAM 103; a non-volatile memory 104; an operation panel 105; an image scanner 106; an image memory 107; an image processor 108; an imaging device 109; an image printer 110; a network communication controller 111; one or more actuators 112; and a USB connector 113.

The CPU 101 controls the MFP 1 in a unified and systematic manner and executes multiple functions such as copier function, printer function, scanner function, and facsimile function. In this embodiment, the camera 2b performs imaging then identifies a belonging, a bodily characteristic, and others of the user by performing analysis on the obtained image. The CPU 101 takes a specified user assistance action with reference to the analytical results, which will be later described in details.

The ROM 102 is a memory that stores operation programs, setting values, and other data for the CPU 101 to execute processing; the RAM 103 is a memory that serves as a workspace for the CPU 101 to run the operation programs stored on the ROM 102.

The non-volatile memory 104 is a memory that stores various types of data including a user assistance lookup table to be further described in this embodiment.

The operation panel 105 is a user interface that allows the user to manipulate the MFP 1 and to view messages, the status of the MFP 1, and other information. The operation panel 105 is provided with: a display 105a that is comprised of a liquid-crystal display with a touch screen panel; and a hardware keyboard 105b having various hardware keys such as a start key, a stop key, and numeric keys.

The image scanner 106 reads an image of a document put on a platen not shown in the figure and converts it into an image data format i.e. an electronic data format. The user needs to open up the platen cover (not shown in the figure) to put a document on the platen.

The image memory 107 essentially stores image data obtained by the image scanner 106; the image memory 107 is comprised of a hard disk drive (HDD), for example.

The image processor 108 performs required image processing tasks on image data obtained from a document by the image scanner 106 and print data received from external apparatuses such as personal computers.

After the image processor 108 completes image processing tasks on image data, the imaging device 109 forms a toner image of the image data on a photosensitive drum by an electro-photographic method, for example. The image printer 110 transfers and fixes the toner image onto a sheet of paper, then sends it out of the body of the MFP 1.

The network communication controller 111 is an interface that performs data exchange with the camera 2b and other external apparatuses connected to the MFP 1 through the network 3.

The actuator 112 is a mechanism that sets a target member in motion for user assistance; the actuator 112 is arranged adjacent to the target member so that the actuator 112 can actuate it. The actuator 112 actuates a target member. For example, the actuator 112 opens up the front cover of the MFP 1, ejects and closes a paper tray, and opens up an anti-dust cover for the USB connector 113.

The USB connector 113 is a port for a USB-based device such as a USB flash drive. The USB connector 113 is usually covered by an anti-dust cover that is to be opened up and closed by the actuator 112.

The camera 2b is disposed adjacent to the MFP 1 so that it can perform imaging of the user adjacent to the MFP 1. The camera 2b is essentially provided with: a human body sensor 21; an imaging portion 22, an image analyzer 23, and a network communication controller 24.

The human body sensor 21 senses a user in the sensitivity range. When the human body sensor 21 senses a user, the imaging portion 22 starts imaging of the user. The imaging portion 22 may perform imaging by taking a still image or a video. The imaging portion 22 may perform imaging by taking one or more still images. The imaging portion 22 may perform imaging of the full body of the user or the belonging of the user in a selective manner. The imaging portion 22 may perform close-up imaging or distant imaging. The camera 2b may sense a user in the sensitivity range without using the human body sensor 21; in this case, the camera 2b may sense the same with reference to the image obtained by the imaging portion 22.

The image analyzer 23 performs analysis on the image obtained by the imaging portion 22. By performing analysis on the image, the image analyzer 23 identifies the belonging of the user, the condition and motion of the belonging, the motion of the user, and a bodily characteristic of the user. It is a well-known technique that allows identifying a belonging of a user, the condition and motion of the belonging, the motion of the user, and a bodily characteristic of the user by performing analysis on an image.

The network communication controller 24 is a communication interface that performs data exchange with the MFP 1 through the network 3. The camera 2b transmits an analytical result on the image to the MFP 1 via the network communication controller 24.

Figure 3:
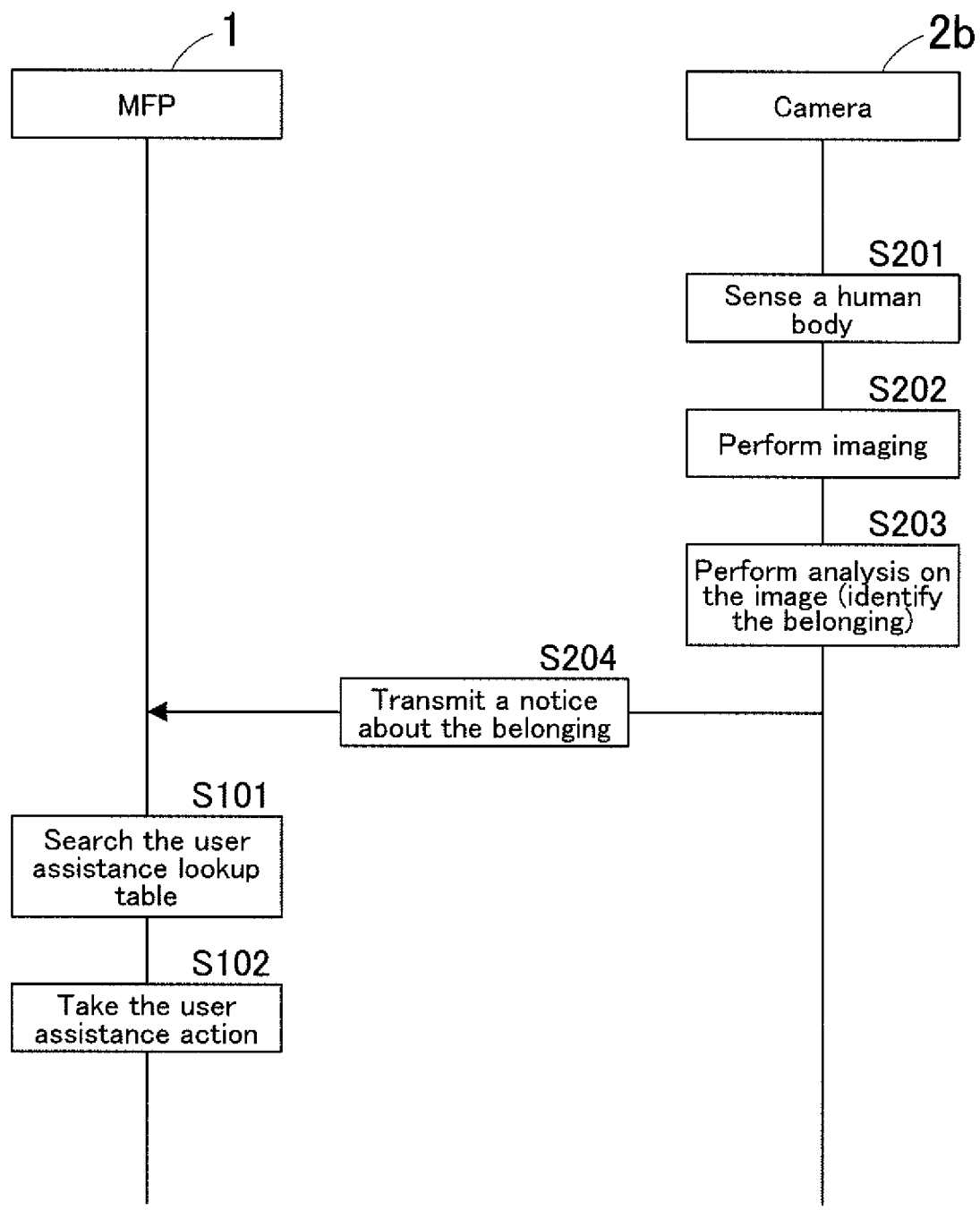
FIG. 3 is a sequence diagram for reference in describing a first procedure to be performed by the image forming system illustrated in FIG. 2.

FIG. 3 is a sequence diagram for reference in describing a first procedure to be performed by the image forming system illustrated in FIG. 2. The operations of the MFP 1 in FIG. 3, FIG. 5, and the following figures are conducted by the CPU 101 of the MFP 1 running operation programs stored on a recording medium such as the ROM 102.

The camera 2b senses a human body (user) adjacent to the MFP 1 (Step S201). The imaging portion 22 performs imaging of the user and the belonging of the user (Step S202). The image analyzer 23 performs analysis on the image and identifies the belonging of the user (Step S203). The belonging of the user is a supply such as a toner cartridge, an imaging unit including a photoconductor, paper, or a document. Most MFPs have separate toner cartridges and imaging units for different toner colors, and there are toner cartridges and imaging units of multiple models. Meanwhile, there is paper of multiple sizes, for example: A4, A3, and B4 paper; also, there is paper of multiple types, for example: thick paper and tinted paper. So, the image analyzer 23 is allowed to identify at least one of the following characteristics of the supply by performing analysis on the image: color, shape, size, package description, and package design.

The camera 2b transmits a notice about the identified belonging to the MFP 1 through the network 3 (Step S204).

Receiving the notice from the camera 2b, the MFP 1 searches the user assistance lookup table stored on the non-volatile memory 104 for a record associated with the identified belonging (Step S101). The MFP 1 retrieves a specified target member and user assistance action from the user assistance lookup table and takes the user assistance action by making the actuator 112 actuate the target member.

FIG. 4 shows a user assistance lookup table. In the user assistance lookup table, a belonging of the user, a target member, and a user assistance action are specified in advance as one record. For example, the front cover of the MFP 1 and "open cover" are associated with cyan (C), magenta (M), yellow (Y), and black (K) toner cartridges and imaging units, as a target member and a user assistance action. A3, A4, and B4 paper tray are associated with A3, A4, and B4 paper as target members, respectively, and "eject tray" is associated with the same as a user assistance action. The A4 paper trays are an upper and lower one both associated with A4 paper. Alternatively, each paper tray may be associated with paper of at least one of a size, a type, and another characteristic.

When the belonging is identified as a document, the target member is a platen cover for fixing a document in position and the user assistance action is "open cover".

When the belonging is identified as a USB flash drive, the target member is an anti-dust cover for the USB connector 113 and the user assistance action is "open cover".

When the belonging of the user is identified as any of C, M, Y, and K toner cartridges or any of C, M, Y, and K imaging units, for example, the MFP 1 searches the user assistance lookup table shown in FIG. 4 for a record associated with the identified toner cartridge or imaging unit. The MFP 1 retrieves "front cover" and "open cover" as a specified target member and user assistance action from the user assistance lookup table and makes the actuator 112 open up the front cover of the MFP 1.

When the user carrying a toner cartridge or imaging unit is adjacent to the MFP 1, it is highly possible that he/she needs to open up the front cover of the MFP 1 to replace a toner cartridge or imaging unit with it. The MFP 1 reacts to the user's desire in a mechanical manner by opening up the front cover. This is very convenient: the user does not have to put the toner cartridge or imaging unit down on the floor to open up the front cover.

Similarly, when the belonging of the user is identified as paper of either or both of a certain size and type of the paper, for example, the MFP 1 searches the user assistance lookup table shown in FIG. 4 for a record associated with the identified paper. The MFP 1 retrieves "paper tray" and "eject tray" as a specified target member and user assistance action from the user assistance lookup table and makes the actuator 112 eject the paper tray.

When the user carrying paper is adjacent to the MFP 1, it is highly possible that he/she needs to open up a paper tray to load the paper in it. The MFP 1 reacts to the user's desire in a mechanical manner by ejecting the paper tray. This is very convenient: the user does not have to put the paper down on the floor to open up the paper tray.

Similarly, when the belonging of the user is identified as a document, for example, the MFP 1 searches the user assistance lookup table shown in FIG. 4 for a record associated with document. The MFP 1 retrieves "platen cover" and "open cover" as a specified target member and user assistance action from the user assistance lookup table and makes the actuator 112 open up the platen cover of the MFP 1. The user does not have to open up the platen cover.

Similarly, when the belonging of the user is identified as a USB flash drive, for example, the MFP 1 searches the user assistance lookup table shown in FIG. 4 for a record associated with USB flash drive. The MFP 1 retrieves "anti-dust cover" and "open cover" as a specified target member and user assistance action from the user assistance lookup table and makes the actuator 112 open up an anti-dust USB connector cover of the MFP 1. The user does not have to open up an anti-dust cover that is typically small.

Figure 5:
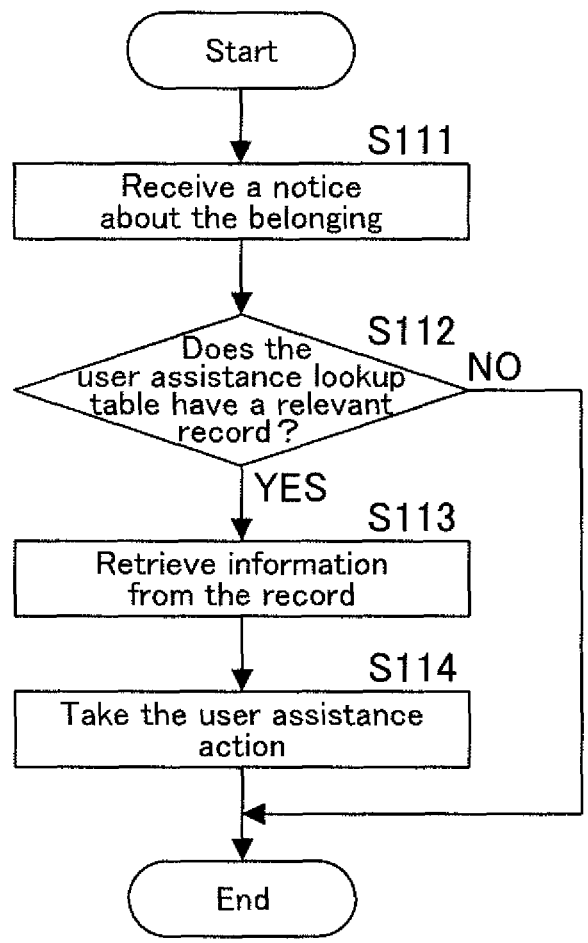
FIG. 5 is a flowchart representing the operations to be performed by the image forming apparatus upon receiving a notice about the belonging of the user from the camera, for a first example.

FIG. 5 is a flowchart representing the operations to be performed by the MFP 1 upon receiving a notice about the belonging of the user from the camera 2b, for a first example.

The MFP 1 receives a notice about the belonging of the user in Step S111. In Step S112, the MFP 1 judges whether or not the user assistance lookup table has a record associated with the identified belonging. If the user assistance lookup table has a record associated with the identified belonging (YES in Step S112), the MFP 1 retrieves a specified target member and user assistance action therefrom in Step S113. In Step S114, the MFP 1 takes the user assistance action by making the actuator 112 actuate the target member.

In Step S112, if the user assistance lookup table has no record associated with the identified belonging (NO in Step S112), the MFP 1 does not take the user assistance action. In this case, the user will have to do it in the conventional manner.

Figure 6:
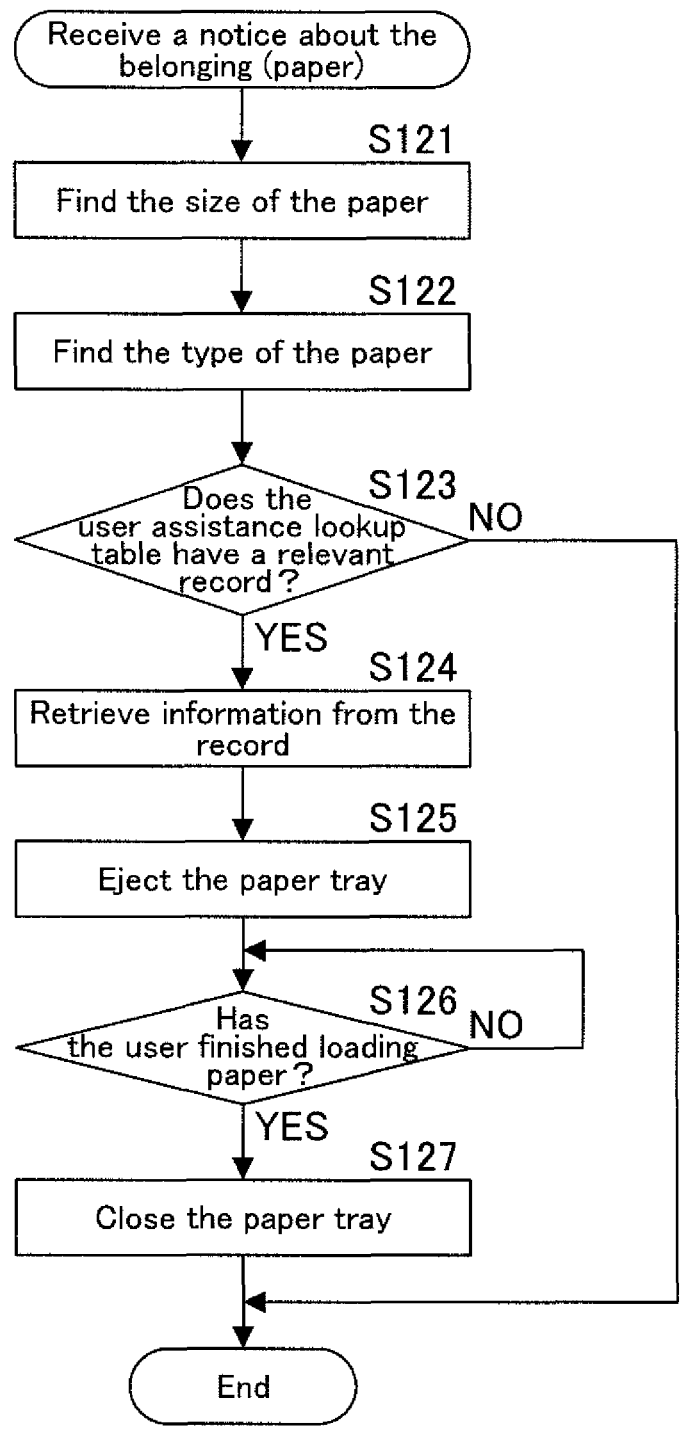
FIG. 6 is a flowchart representing the operations to be performed by the image forming apparatus upon receiving a notice about the belonging of the user from the camera, for a second example.

FIG. 6 is a flowchart representing the operations to be performed by the MFP 1 upon receiving a notice about the belonging of the user from the camera 2b, for a second example. In this example, the camera 2b identifies the paper to supply, then transmits a notice of either or both of the identified size and type of the paper to the MFP 1.

Receiving the notice, the MFP 1 finds the size of the paper in Step S121 then the type of the paper in Step S122. In Step S123, the MFP 1 judges whether or not the user assistance lookup table has a record associated with paper of that size and type. If the user assistance lookup table has a record associated with paper of that size and type (YES in Step S123), the MFP 1 retrieves a specified paper tray and user assistance action therefrom in Step S124. In Step S125, the MFP 1 makes the actuator 112 eject the paper tray.

In Step S126, the MFP 1 judges whether or not the user has finished loading paper, by a load sensor, for example. If the user has not finished yet (NO in Step S126), the procedure waits until he/she finishes. If the user has finished (YES in Step S126), the MFP 1 makes the actuator 112 close the paper tray in Step S127.

In Step S123, if the user assistance lookup table has no record associated with paper of that size and type (NO in Step S123), the MFP 1 does not take the user assistance action.

Figure 7:
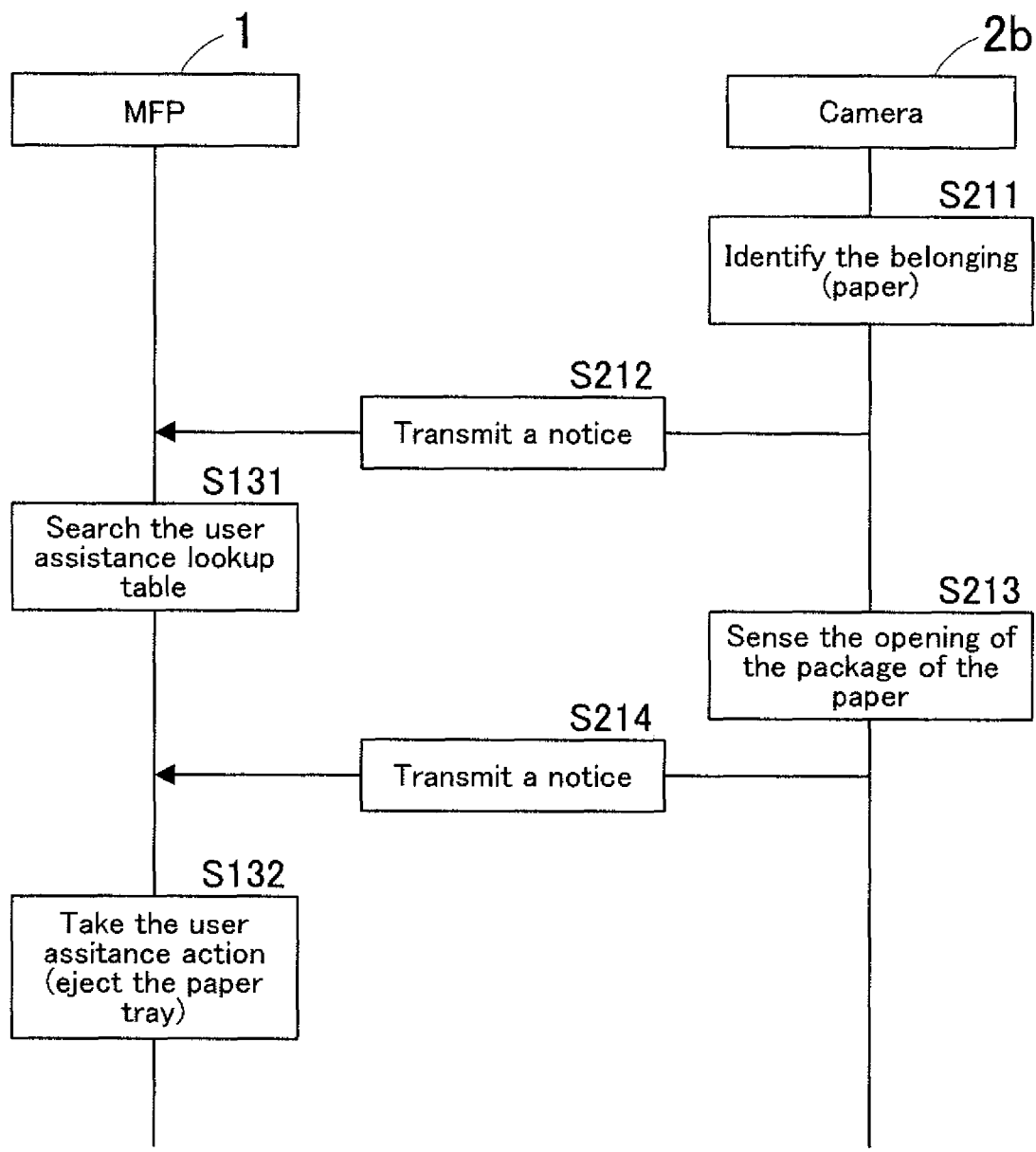
FIG. 7 is a sequence diagram for reference in describing a second procedure to be performed by the image forming system illustrated in FIG. 2.

FIG. 7 is a sequence diagram for reference in describing a second procedure to be performed by the image forming system illustrated in FIG. 2. In this embodiment, the camera 2b identifies the belonging of the user and either or both of the condition and motion of the belonging by performing analysis on the image, and the MFP 1 adjusts the timing for taking a user assistance action with reference to either or both of the condition and motion of the belonging.

The camera 2b performs imaging of a user adjacent to the MFP 1 by the imaging portion 22. The camera 2b performs analysis on the obtained image and identifies the belonging of the user by the image analyzer 23 (Step S211). In this embodiment, by the image analyzer 23, the camera 2b identifies the belonging as paper of either or both of a certain size and type and the condition of the package of the paper i.e. whether or not the package is already opened. The camera 2b then transmits a notice of the analytical results to the MFP 1.

After identifying the belonging as paper of either or both a certain size and type, the camera 2b transmits a notice about the identified paper to the MFP 1 through the network 3 (Step S212).

Receiving the notice from the camera 2b, the MFP 1 searches the user assistance lookup table stored on the non-volatile memory 104 for a record associated with the identified paper (Step S131). The MFP 1 retrieves a specified paper tray and user assistance action from the user assistance lookup table and waits until the timing is on.

If the camera 2b senses the opening of the package of the paper after that (Step S213), the camera 2b transmits a notice of the sensed event to the MFP 1 (Step S214). Receiving the notice therefrom, the MFP 1 ejects the paper tray, which is the specified user assistance action (Step S132).

As described above, the MFP 1 adjusts the timing for taking a user assistance action with reference to either or both of the condition and motion of the belonging of the user. The MFP 1 is thus capable of taking a user assistance action at the right timing.

Figure 8:
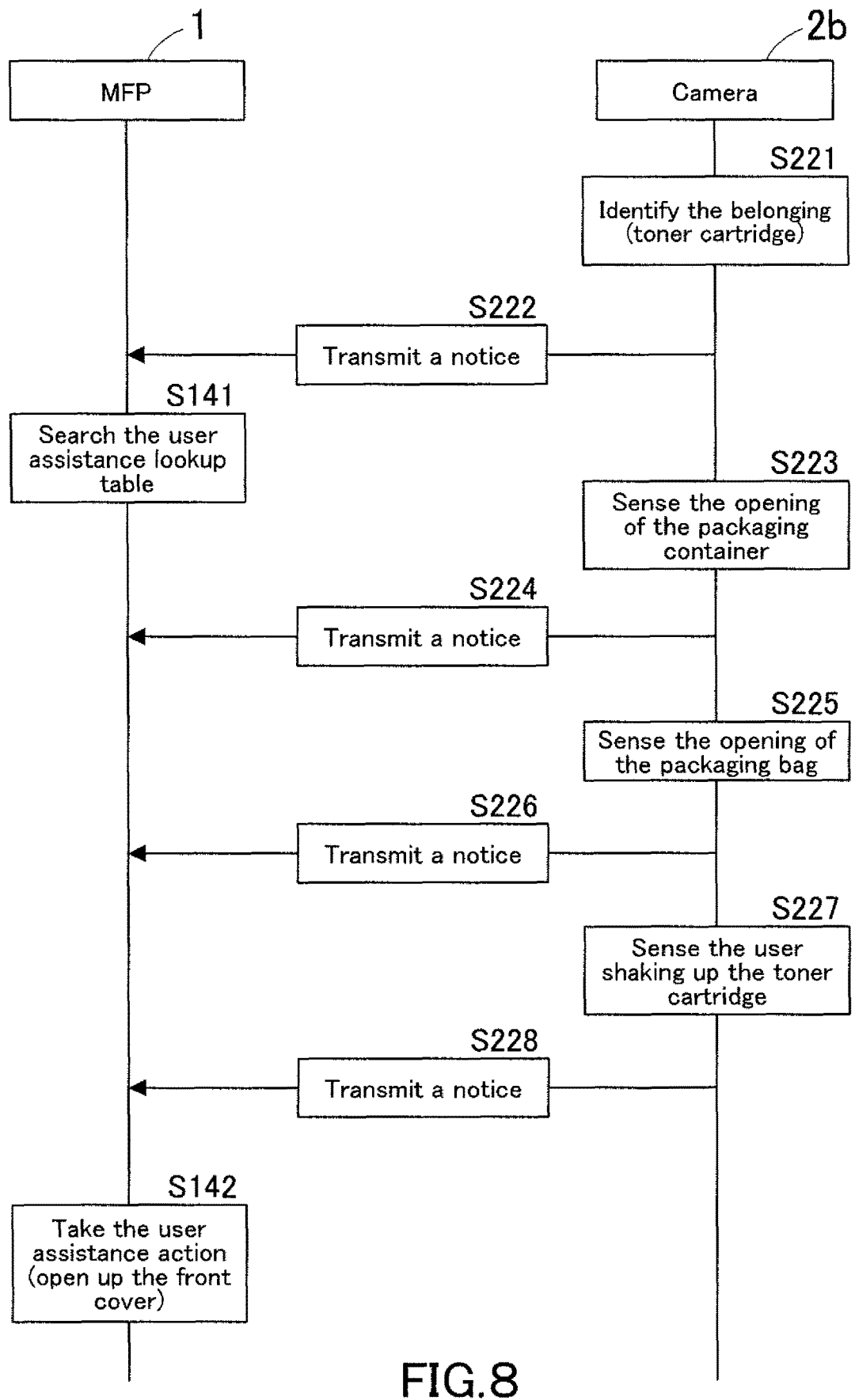
FIG. 8 is a sequence diagram for reference in describing a third procedure to be performed by the image forming system illustrated in FIG. 2.

FIG. 8 is a sequence diagram for reference in describing a third procedure to be performed by the image forming system illustrated in FIG. 2. In this embodiment, the camera 2b identifies the belonging of the user and the motion of the user by performing analysis on the obtained image, and the MFP 1 adjusts the timing for taking a user assistance action with reference to the identified motion of the user.

The camera 2b performs imaging of a user adjacent to the MFP 1 by the imaging portion 22. The camera 2b performs analysis on the obtained image and identifies the belonging of the user by the image analyzer 23 (Step S221). In this embodiment, by the image analyzer 23, the camera 2b identifies the belonging as a toner cartridge of a certain toner color and judges whether or not the package of the toner cartridge is already opened. The camera 2b then transmits a notice of the analytical results to the MFP 1.

After identifying the belonging as a toner cartridge of a certain toner color, the camera 2b transmits a notice about the identified toner cartridge to the MFP 1 through the network 3 (Step S222).

Receiving the notice from the camera 2b, the MFP 1 searches the user assistance lookup table stored on the non-volatile memory 104 for a record associated with the identified toner cartridge (Step S141). The MFP 1 retrieves "front cover" as a specified target member and user assistance action from the user assistance lookup table and waits until the timing is on.

If the camera 2b senses the user opening the packaging container of the toner cartridge after that (Step S223), the camera 2b transmits a notice of the sensed event to the MFP 1 (Step S224). If the camera 2b further senses the user opening the packaging bag of the toner cartridge (Step S225), the camera 2b transmits a notice of the sensed event to the MFP 1 (Step S226). If the camera 2b still further senses the user shaking up the toner cartridge (Step S227), the camera 2b transmits a notice of the sensed event to the MFP 1 (Step S228).

Receiving the notice therefrom, the MFP 1 opens up the front cover, which is the specified user assistance action (Step S142).

As described above, the MFP 1 adjusts the timing for taking a user assistance action with reference to the motion of the user. The MFP 1 is thus capable of taking a user assistance action at the right timing.

Figure 9:
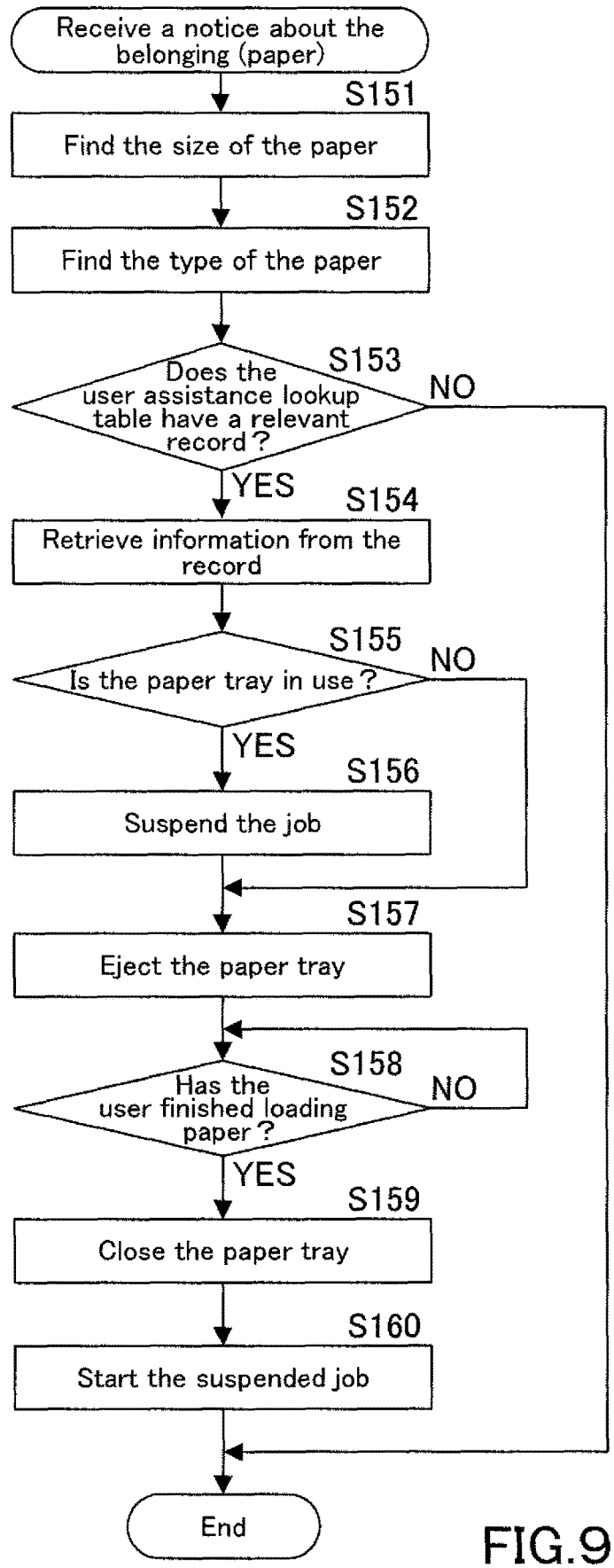
FIG. 9 is a flowchart representing the operations to be performed by the image forming apparatus upon receiving a notice about the belonging of the user from the camera, for a third example.

FIG. 9 is a flowchart representing the operations to be performed by the MFP 1 upon receiving a notice about the belonging of the user from the camera 2b, for a third example. In this example, the camera 2b identifies the paper to supply, then transmits a notice of either or both of the identified size and type of the paper to the MFP 1.

Receiving the notice, the MFP 1 finds the size of the paper in Step S151 then the type of the paper in Step S152. In Step S153, the MFP 1 judges whether or not the user assistance lookup table has a record associated with paper of that size and type. If the user assistance lookup table has a record associated with paper of that size and type (YES in Step S153), the MFP 1 retrieves a specified paper tray and "eject tray" as a specified user assistance action therefrom in Step S154. In Step S155, the MFP 1 judges whether or not the paper tray is in use by a running job. If it is in use (YES in Step S155), the MFP 1 suspends the running job in Step S156. The procedure then proceeds to Step S157. If it is not in use (NO in Step S155), the procedure proceeds directly to Step S157.

In Step S157, the MFP 1 ejects the paper tray, which is the specified user assistance action.

In Step S158, the MFP 1 judges whether or not the user has finished loading paper, by a load sensor, for example. If the user has not finished yet (NO in Step S158), the procedure waits until he/she finishes. If the user has finished (YES in Step S158), the MFP 1 makes the actuator 112 close the paper tray in Step S159. In Step S160, the MFP 1 starts the suspended job.

In Step S153, if the user assistance lookup table has no record associated with paper of that size and type (NO in Step S153), the MFP 1 does not take the user assistance action.

In the embodiment described with reference to FIG. 9, if the paper tray associated with the paper carried by the user is in use by a running job, the MFP 1 suspends the running job to eject the paper tray. So, the user will not have to be bothered by an active paper tray being accidentally ejected. The MFP 1 may not suspend the running job but allow it to complete then eject the paper tray. Also, in this case, the user will not have to be bothered by an active paper tray being accidentally ejected.

In the embodiment described above, if the paper tray associated with the paper carried by the user is in use by a running job, the MFP 1 suspends the running job. However, when the user carries A4 paper, for example, more than one paper tray is associated with the paper according to the user assistance lookup table shown in FIG. 4. To solve this problem, the MFP 1 may select and eject another paper tray than that in use by the running job. In this case, there is no need to suspend the running job.

Figure 10:
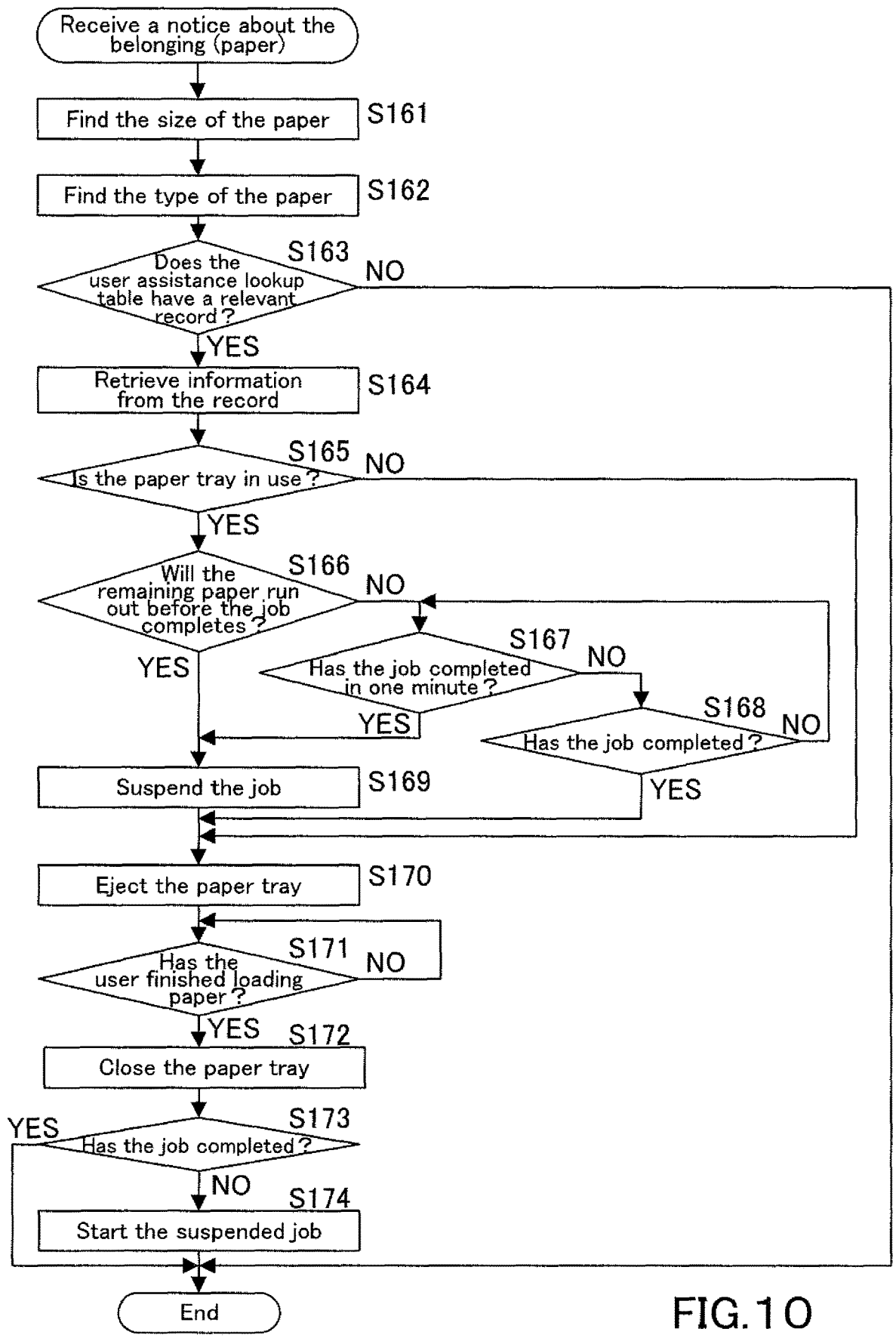
FIG. 10 is a flowchart representing the operations to be performed by the image forming apparatus upon receiving a notice about the belonging of the user from the camera, for a fourth example.

FIG. 10 is a flowchart representing the operations to be performed by the MFP 1 upon receiving a notice about the belonging of the user from the camera 2b, for a fourth example. In this example, the camera 2b identifies the paper to supply, then transmits a notice of either or both of the identified size and type of the paper to the MFP 1. Furthermore, the MFP 1 performs the following operations: sensing the amount of paper remaining in the paper tray by a sensor, for example; comparing the number of sheets to be used by the running job to the amount of paper remaining in the paper tray; and judging whether or not the paper remaining in the paper tray will run out before the running job completes.

Receiving the notice, the MFP 1 finds the size of the paper in Step S161 then the type of the paper in Step S162. In Step S163, the MFP 1 judges whether or not the user assistance lookup table has a record associated with paper of that size and type. If the user assistance lookup table has a record associated with paper of that size and type (YES in Step S163), the MFP 1 retrieves a specified paper tray and "eject tray" as a specified user assistance action therefrom in Step S164. In Step S165, the MFP 1 judges whether or not the paper tray is in use by a running job. If it is in use (YES in Step S165), the procedure proceeds to Step S166, in which the MFP 1 judges whether or not the paper remaining in the paper tray will run out before the running job completes. If it will run out (YES in Step S166), the MFP 1 suspends the running job in Step S169. The procedure then proceeds to Step S170.

If it will not run out (NO in Step S166), the procedure proceeds to Step S167, in which the MFP 1 judges whether or not the job has completed in a certain period. In other words, the MFP 1 judges whether or not the job is still running after a certain period. This period is predetermined and it is one minute in this embodiment. If the job is still running after a certain period (YES in Step S167), the MFP 1 suspends the running job in Step S169. The procedure then proceeds to Step S170. If the job is not still running after a certain period (NO in Step S167), the procedure proceeds to Step S168, in which the MFP 1 judges whether or not the job has completed. If it has not completed yet (NO in Step S168), the procedure returns to Step S167. If it has completed (YES in Step S168), the procedure proceeds to Step S170.

Back to Step S165, if the paper tray is not in use by a running job (NO in Step S165), the procedure proceeds to Step S170.

In Step S170, the MFP 1 ejects the paper tray, which is the specified user assistance action. In Step S171, the MFP 1 judges whether or not the user has finished loading paper, by a load sensor, for example. If the user has not finished yet (NO in Step S171), the procedure waits until he/she finishes. If the user has finished (YES in Step S171), the MFP 1 makes the actuator 112 close the paper tray in Step S172. In Step S173, the MFP 1 judges whether or not the job has completed. If it has not completed yet (NO in Step S173), the MFP 1 starts the suspended job in Step S174. If the job has completed (YES in Step S173), the procedure terminates immediately.

In Step S163, if the user assistance lookup table has no record associated with paper of that size and type (NO in Step S163), the MFP 1 does not take the user assistance action.

In the embodiment described with reference to FIG. 10, the MFP 1 judges whether or not the remaining supply will run out before the running job completes. If the remaining supply will run out before the running job completes, the MFP 1 suspends the running job to take the user assistance action. So, the user does not have to wait for user assistance until the remaining supply runs out.

If the job has completed in a predetermined period, the MFP 1 immediately takes the user assistance action; if the job has not completed in a predetermined period, the MFP 1 suspends the running job then takes the user assistance action. So, the user will not have to wait for user assistance until the job completes, for more than a predetermined period, in other words, the user carrying a belonging such as a supply will not have to wait for so long in the vicinity of the MFP 1.

Figure 11:
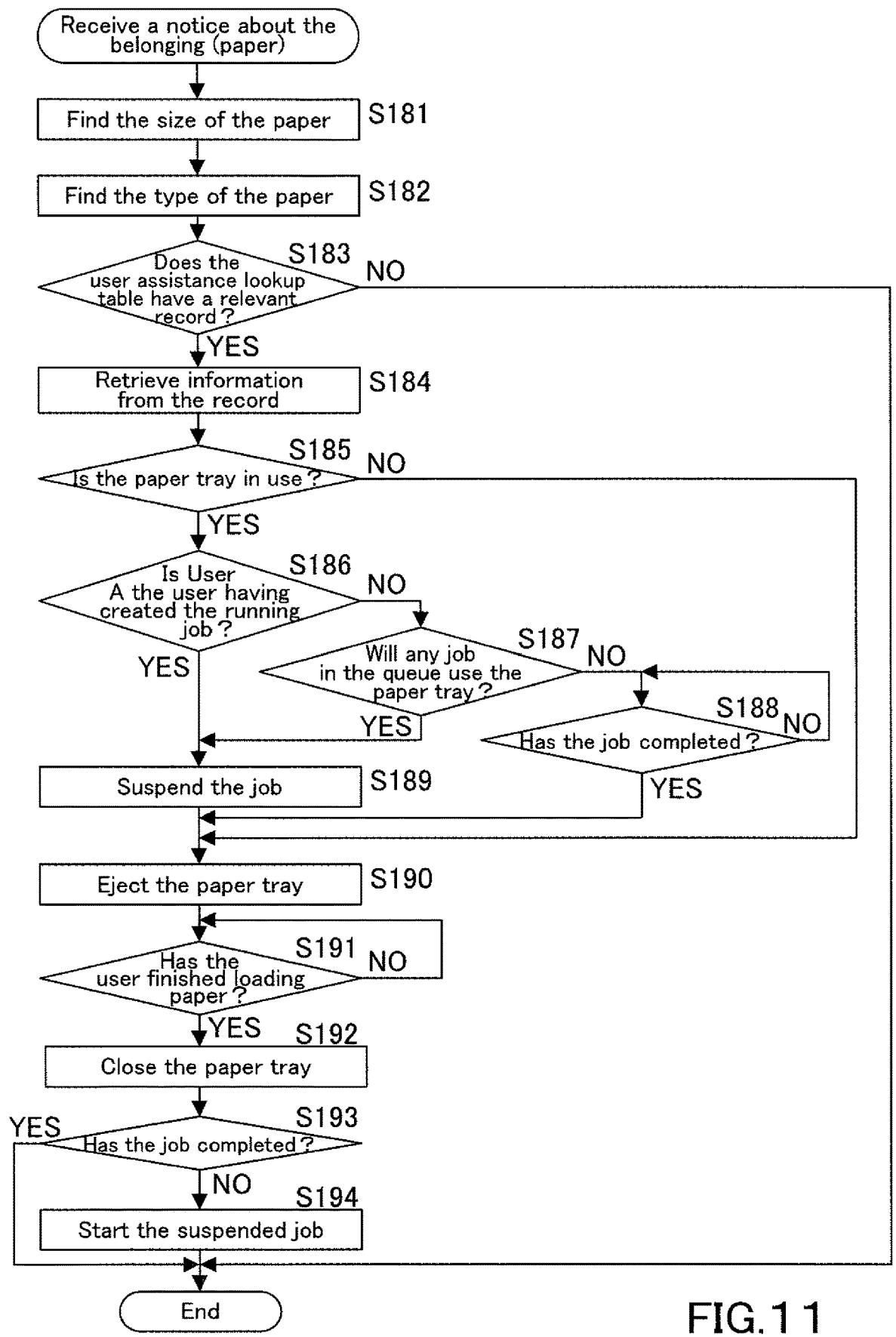
FIG. 11 is a flowchart representing the operations to be performed by the image forming apparatus upon receiving a notice about the belonging of the user from the camera, for a fifth example.

FIG. 11 is a flowchart representing the operations to be performed by the MFP 1 upon receiving a notice about the belonging of the user from the camera 2b, for a fifth example. In this example, the camera 2b identifies the user carrying the belonging, and the MFP 1 judges whether or not the identified user is the user having created a running job and performs different operations depending on the judgment result. Although the method of the identification is not limited to this example, the camera 2b is allowed to identify the user carrying a belonging by performing analysis on the image by the image analyzer 23. In this example, by the image analyzer 23, the camera 2b identifies the user as User A and identifies the paper to supply. The camera 2b then transmits a notice of User A and either or both of the identified size and type of the paper to the MFP 1.

Receiving the notice, the MFP 1 finds the size of the paper in Step S181 then the type of the paper in Step S182. In Step S183, the MFP 1 judges whether or not the user assistance lookup table has a record associated with paper of that size and type. If the user assistance lookup table has a record associated with paper of that size and type (YES in Step S183), the MFP 1 retrieves a specified paper tray and "eject tray" as a specified user assistance action therefrom in Step S184. In Step S185, the MFP 1 judges whether or not the paper tray is in use by a running job. If it is in use (YES in Step S185), the procedure proceeds to Step S186, in which the MFP 1 judges whether or not User A is the user having created the running job. If User A is the user having created the running job (YES in Step S186), this means it is highly possible that User A is carrying the paper to supply. The MFP 1 thus suspends the running job in Step S189. The procedure then proceeds to Step S190.

If User A is not the user having created the running job (NO in Step S186), the procedure proceeds to Step S187, in which the MFP 1 judges whether or not any job in the queue will use the same paper tray. If any job in the queue will use it (YES in Step S187), the MFP 1 suspends the running job in Step S189 in order not to make User A wait for so long adjacent to the MFP 1. The procedure then proceeds to Step S190. If any job in the queue will not use it (NO in Step S187), the procedure proceeds to Step S188, in which the MFP 1 judges whether or not the job has completed. If it has not completed yet (NO in Step S188), the procedure waits until it is completed. If the job has completed (YES in Step S188), the procedure proceeds to Step S190. The procedure may skip Step S187 and proceed directly to Step S188.

Back to Step S185, if the paper tray is not in use by a running job (NO in Step S185), the procedure proceeds to Step S190.

In Step S190, the MFP 1 ejects the paper tray, which is the specified user assistance action. In Step S191, the MFP 1 judges whether or not the user has finished loading paper, by a load sensor, for example. If the user has not finished yet (NO in Step S191), the procedure waits until he/she finishes. If the user has finished (YES in Step S191), the MFP 1 makes the actuator 112 close the paper tray in Step S192. In Step S193, the MFP 1 judges whether or not the job has completed. If it has not completed yet (NO in Step S193), the MFP 1 starts the suspended job in Step S194. If the job has completed (YES in Step S193), the procedure terminates immediately.

In Step S183, if the user assistance lookup table has no record associated with paper of that size and type (NO in Step S183), the MFP 1 does not take the user assistance action.

In the embodiment described with reference to FIG. 11, if the user carrying a belonging is not the user having created a running job, the MFP 1 does not suspend the running job but allows it to complete then takes the user assistance action. So, the user will not have to be bothered by the running job being accidentally suspended. Furthermore, if any job in the queue will use an active target member that is associated with the running job, the MFP 1 suspends the running job then takes the user assistance action. So, the user carrying a belonging such as a supply will not have to wait for so long in the vicinity of the MFP 1.

In this embodiment in which the user carrying a belonging is identified, all users permitted to use user assistance service may be specified in advance in the user assistance lookup table so that the MFP 1 can judge whether or not to take the user assistance action depending on whether or not the identified user is permitted to use user assistance services.

Figure 12:
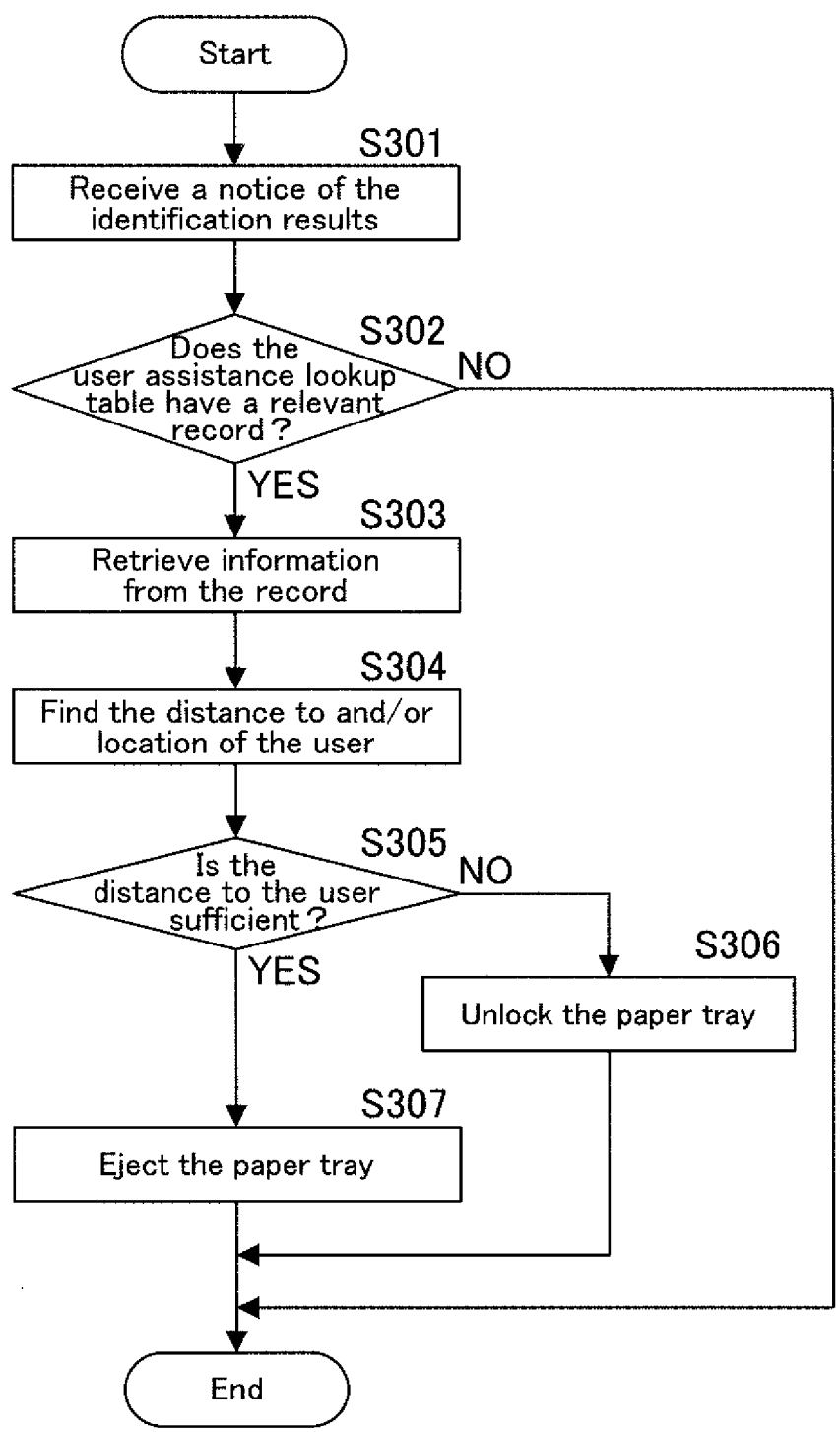
FIG. 12 is a flowchart representing the operations to be performed by the image forming apparatus upon receiving a notice about the belonging of the user from the camera, for a sixth example.

FIG. 12 is a flowchart representing the operations to be performed by the MFP 1 upon receiving a notice about the belonging of the user from the camera 2b, for a sixth example. In this example, the camera 2b senses either or both of the range to and location of the user carrying a belonging, and the MFP 1 selects different user assistances action depending on either or both of the range to and location of the user. Although the method of the sensing is not limited to this example, the camera 2b is allowed to sense either or both of the range to and location of the user carrying a belonging by performing analysis on the image by the image analyzer 23. Alternatively, the image analyzer 23 may sense the same by a range and location sensor, for example. In this example, the camera 2b identifies the user as User A and identifies the paper to supply. The camera 2b then transmits a notice of either or both of the identified size and type of the paper and a notice of either or both of the obtained range to and location of the user, to the MFP 1.

The MFP 1 receives the notices from the camera 2b in Step S301. In Step S302, the MFP 1 judges whether or not the user assistance lookup table has a record associated with paper of that size and type. If the user assistance lookup table has a record associated with paper of that size and type (YES in Step S302), the MFP 1 retrieves a specified paper tray and user assistance action therefrom in Step S303. In this example, the user assistance action is "eject tray" and "unlock tray".

The MFP 1 finds either or both of the range to and location of the user in Step S304. In Step S305, the MFP 1 judges whether or not the range to the user is sufficient. If it is sufficient (YES in Step S305), the MFP 1 ejects the paper tray in Step S307, which is the specified user assistance action. Ensuring a sufficient range between the MFP 1 and the user is to protect the user from being accidentally hit on the body by the paper tray when it is ejected.

In contrast, if the range to the user is not sufficient (NO in Step S305), the MFP 1 unlocks the paper tray in Step S306, which is the specified user assistance action. This action is also to protect the user from being accidentally hit on the body by the paper tray when it is ejected.

In Step S302, if the user assistance lookup table has no record associated with paper of that size and type (NO in Step S302), the MFP 1 does not take the user assistance action.

In the embodiment described with reference to FIG. 12, the MFP 1 takes a user assistance action in a different manner depending on either or both of the range to and location of the user carrying a belonging. The MFP 1 thus takes a user assistance action in a suitable manner for either or both of the range to and location of the user.

Alternatively, the MFP 1 may take a user assistance action to a different extent depending on either or both of the range to and location of the user. For example, if the range to the user is sufficient, the MFP 1 may eject the paper tray to a greater extent of the depth than it does if the range to the user is not sufficient.

Figure 13:
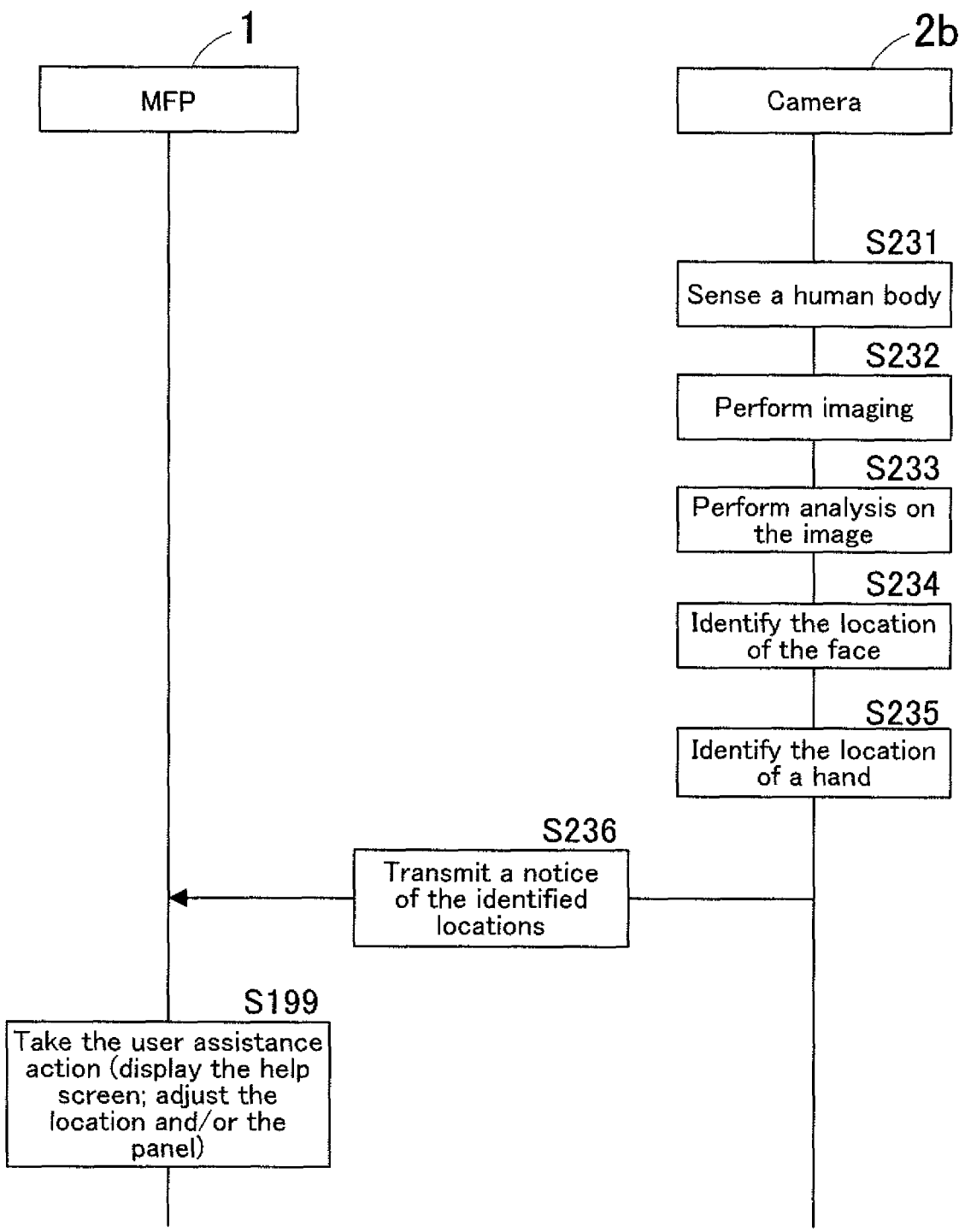
FIG. 13 is a sequence diagram for reference in describing a fourth procedure to be performed by the image forming system illustrated in FIG. 2.

FIG. 13 is a sequence diagram for reference in describing a fourth procedure to be performed by the image forming system illustrated in FIG. 2. In this embodiment, the camera 2b performs imaging of the full body or a part of the body of the user by the imaging portion 22, and obtains bodily information of the user by performing analysis on the image by the image analyzer 23. In this example, bodily information of the user is the locations of the user's face and hand, for example. The CPU 101 of the MFP 1 takes a specified user assistance action associated with the obtained bodily information, by the actuator 112; this is a user assistance action that is other than that associated with the identified belonging.

As described above, the MFP 1 takes a user assistance action that is other than that associated with the identified belonging, the advantages of which will be further described below.

While the MFP 1 opens up the paper tray or the front cover in a mechanical manner, the user may prefer to load paper or replace a toner cartridge with reference to a help screen (for example, for instructions of how to set paper or a toner cartridge in the right orientation). In this case, the user will be able to ensure viewability of a help screen on the operation panel 105 if the MFP 1 can adjust the angle, for example, of the operation panel 105 with reference to a bodily characteristic of the user such as the user's height. In order to meet the preferences of the user, it is preferred that the MFP 1 take a user assistance action that is other than that associated with the identified belonging.

Referring to FIG. 13, the camera 2b senses a human body (user) adjacent to the MFP 1 (Step S231). The imaging portion 22 performs imaging of the user (Step S232). The image analyzer 23 performs analysis on the image (Step S233) and senses the location of the user's face (Step S234) and the location of the user's hand (Step S235).

The camera 2b transmits a notice of the obtained locations of the user's face and hand to the MFP 1 through the network 3 (Step S236).

Receiving the notice from the camera 2b, the CPU 101 of the MFP 1 takes a user assistance action associated with the obtained locations of the user's face and hand, by the actuator 112; this is a user assistance action that is other than that associated with the identified belonging.

This user assistance action is, for example, adjusting the location and angle of the operation panel 105 with reference to the locations of the user's face and hand.

It is preferred that the procedure in FIG. 13 be allowed to undergo Step S233 and the following steps while the procedure in FIG. 3 undergoes Step S203 and the following steps.

A bodily characteristic, a target member, and a user assistance action may be associated with each other and specified in advance in a user assistance lookup table as shown in FIG. 4 so that the MFP 1 can select a user assistance action associated with the bodily characteristic.

While some embodiments of the present invention have been described in details herein it should be understood that the present invention is in no way limited to the foregoing embodiments.

For example, the MFP 1 and the camera 2b are disposed separately in the foregoing embodiments; alternatively, the MFP 1 may be provided with the camera 2b. For another example, while the MFP 1 and the imaging portion 22 are disposed separately, the MFP 1 may be provided with the image analyzer 23. In this case, the imaging portion 22 performs imaging, and the MFP 1 performs analysis on the image received therefrom and identifies the belonging, either or both of the condition and motion of the belonging, the motion of the user, and the user itself. Instead of the MFP 1, an external server, for example, may be provided with the image analyzer 23.

For yet another example, the MFP 1 stores the user assistance lookup table in the foregoing embodiments; alternatively, an external server, for example, may store the user assistance lookup table so that the MFP 1 can download it from the server.

Although one or more embodiments of the present invention have been described and illustrated in detail, the disclosed embodiments are made for purposes of illustration and example only and not limitation. The scope of the present invention should be interpreted by terms of the appended claims.

What is claimed is:

1. An image forming system comprising:
    an image forming apparatus;
    an imaging portion that performs imaging of a belonging of a user, the user being adjacent to the image forming apparatus;
    a belonging analyzer that identifies the belonging by performing analysis on an image obtained by the imaging portion;
    a memory that stores a user assistance lookup table, the user assistance lookup table associating pieces of information in advance including a belonging of a user; a user assistance action, the user assistance action being a mechanical opening operation; and a target member of the image forming apparatus to be affected by the user assistance action;
    a searcher that retrieves a user assistance action and target member both associated with the belonging identified by the belonging analyzer, by searching the user assistance lookup table for a record associated with the identified belonging, the user assistance lookup table being stored on the memory; and
    a hardware processor that makes the image forming apparatus take the user assistance action retrieved by the searcher, by the target member retrieved by the searcher.

2. The image forming system according to claim 1, wherein:
    the belonging is a supply and there are multiple types of the supply;
    the user assistance lookup table associating pieces of information in advance including the user assistance action; the target member to be affected by the user assistance action; and the supply of each type;
    the belonging analyzer identifies the type of the supply from a characteristic of the supply by performing analysis on the image, the supply being carried by the user; and
    the searcher retrieves a user assistance action associated with a supply of the identified type.

3. The image forming system according to claim 2, wherein:
    the supplies of multiple types are either or both of toner cartridges and imaging units, the imaging units each including a photoconductor;
    the characteristic of the supply carried by the user is at least one of color, shape, size, package description, and package design; and
    the user assistance action is opening the target member and the target member is a cover for the supply.

4. The image forming system according to claim 2, wherein:
    the supplies of multiple types are paper to have image data to be printed thereon;

the characteristic of the supply carried by the user is at least one of color, shape, size, package description, and package design; and the user assistance action is opening the target member and the target member is a paper tray for the supply.

5. The image forming system according to claim 1, wherein:
the belonging of the user is a document to be read by the image forming apparatus; and
the user assistance action is opening the target member and the target member is a cover for fixing the document on a platen.

6. The image forming system according to claim 1, wherein:
the image forming apparatus comprises a connector covered by an anti-dust cover;
the belonging of the user is a plug to be connected to the connector; and
the user assistance action is opening the target member and the target member is the anti-dust cover covering the connector.

7. The image forming system according to claim 1, wherein the hardware processor further adjusts the timing for taking the user assistance action with reference to either or both of the condition and motion of the identified belonging of the user, the belonging having being subjected to imaging by the imaging portion.

8. The image forming system according to claim 1, wherein the hardware processor further adjusts the timing for taking the user assistance action with reference to the motion of the identified user, the user having being subjected to imaging by the imaging portion.

9. The image forming system according to claim 1, wherein:
the belonging of the user is a supply; and
if the image forming apparatus is running a job by the target member retrieved by the searcher, the hardware processor suspends the job or allows the job to complete, then makes the image forming apparatus take the user assistance action.

10. The image forming system according to claim 9, wherein:
the searcher retrieves the user assistance action and multiple target members by searching the user assistance lookup table for records associated with the supply; and
if the image forming apparatus is running a job by one of the target members, the searcher further selects another one of the target members, the another one not being in use by the image forming apparatus, and the hardware processor does not suspend the running job but immediately makes the image forming apparatus take the user assistance action.

11. The image forming system according to claim 9, wherein:
the image forming apparatus further comprises:
a remaining amount sensor that senses the amount of a supply remaining in the image forming apparatus, the supply to be used by a job;
the hardware processor judges whether or not the amount of the remaining supply will run out before the running job completes, the amount being sensed by the remaining amount sensor; and
if it is judged the amount of the remaining supply will run out before the running job completes, the hardware processor suspends the running job then makes the image forming apparatus take the user assistance action.

12. The image forming system according to claim 9, wherein: if the job has completed in a predetermined period, the hardware processor makes the image forming apparatus take the user assistance action; if the job has not completed in a predetermined period, the hardware processor suspends the running job then makes the image forming apparatus take the user assistance action.

13. The image forming system according to claim 9, wherein, if any job in the queue will use the supply, the supply being in use by the running job, the hardware processor suspends the running job then makes the image forming apparatus take the user assistance action.

14. The image forming system according to claim 1, further comprising a user identification portion that identifies the user carrying the belonging, wherein:
whether or not the user assistance action is performed for each user is associated in advance in the user assistance lookup table; and
the hardware processor further judges whether or not to make the image forming apparatus take the user assistance action with reference to the identified user and the user assistance lookup table.

15. The image forming system according to claim 1, further comprising a user identification portion that identifies the user carrying the belonging, wherein, if the identified user is not the user having created the running job, the hardware processor allows the running job to complete then makes the image forming apparatus take the user assistance action.

16. The image forming system according to claim 1, further comprising a range and location sensor that senses either or both of the range to and location of the user carrying the belonging, wherein the hardware processor makes the image forming apparatus take the user assistance action either or both of in a different manner and to a different extent depending on either or both of the range and location obtained by the range and location sensor.

17. The image forming system according to claim 1, further comprising a body analyzer that obtains bodily information of the user by performing analysis on an image obtained by the imaging portion, wherein the hardware processor makes the image forming apparatus take another user assistance action than the user assistance action, the another user assistance action being associated with the bodily information.

18. The image forming system according to claim 17, wherein:
the image forming apparatus comprises an operation panel;
the bodily information is either or both of the locations of the user's face and hand; and
the another user assistance action is adjusting either or both of the height and angle of the operation panel with reference to either or both of the locations of the user's face and hand.

19. An image forming apparatus, wherein:
analysis is performed on an image of a user being adjacent to the image forming apparatus, the image being obtained by an imaging portion connected to the image forming apparatus, and a belonging of the user is identified; and
there is a memory inside or outside of the image forming apparatus, the memory storing a user assistance lookup table, the user assistance lookup table associating pieces of information in advance including a belonging of a user; a user assistance action, the user assistance action being a mechanical operation; and a target member of the image forming apparatus to be affected by the user assistance action, the image forming apparatus comprising:

a searcher that retrieves a user assistance action and target member both associated with the identified belonging, by searching the user assistance lookup table for a record associated with the identified belonging; and a hardware processor that takes the user assistance action retrieved by the searcher, by the target member retrieved by the searcher.

20. The image forming apparatus according to claim 19, further comprising either or both of the imaging portion and a belonging analyzer that identifies the belonging.

21. The image forming apparatus according to claim 20, wherein:

the belonging is a supply and there are multiple types of the supply;

the user assistance lookup table associating pieces of information in advance including the user assistance action; the target member to be affected by the user assistance action; and the supply of each type;

the belonging analyzer identifies the type of the supply from a characteristic of the supply by performing analysis on the image, the supply being carried by the user; and the searcher retrieves a user assistance action associated with a supply of the identified type.

22. The image forming apparatus according to claim 21, wherein:

the supplies of multiple types are either or both of toner cartridges and imaging units, the imaging units each including a photoconductor;

the characteristic of the supply carried by the user is at least one of color, shape, size, package description, and package design; and the user assistance action is opening the target member and the target member is a cover for the supply.

23. The image forming apparatus according to claim 21, wherein:

the supplies of multiple types are paper to have image data to be printed thereon;

the characteristic of the supply carried by the user is at least one of color, shape, size, package description, and package design; and the user assistance action is opening the target member and the target member is a paper tray for the supply.

24. The image forming apparatus according to claim 19, wherein:

the belonging of the user is a document to be read by the image forming apparatus; and the user assistance action is opening the target member and the target member is a cover for fixing the document on a platen.

25. The image forming apparatus according to claim 19, comprising a connector covered by an anti-dust cover, wherein:

the belonging of the user is a plug to be connected to the connector; and the user assistance action is opening the target member and the target member is the anti-dust cover covering the connector.

26. The image forming apparatus according to claim 19, wherein the hardware processor further adjusts the timing for taking the user assistance action with reference to either or both of the condition and motion of the identified belonging of the user, the belonging having being subjected to imaging by the imaging portion.

27. The image forming apparatus according to claim 19, wherein the hardware processor further adjusts the timing for taking the user assistance action with reference to the motion of the identified user, the user having being subjected to imaging by the imaging portion.

28. The image forming apparatus according to claim 19, wherein the belonging of the user is a supply; and if the image forming apparatus is running a job by the target member retrieved by the searcher, the hardware processor suspends the job or allows the job to complete, then takes the user assistance action.

29. The image forming apparatus according to claim 28, wherein:

the searcher retrieves the user assistance action and multiple target members by searching the user assistance lookup table for records associated with the supply; and if the image forming apparatus is running a job by one of the target members, the searcher further selects another one of the target members, the another one not being in use by the image forming apparatus, and the hardware processor does not suspend the running job but immediately takes the user assistance action.

30. The image forming apparatus according to claim 28, further comprising:

a remaining amount sensor that senses the amount of a supply remaining in the image forming apparatus, the supply to be used by a job;

the hardware processor judges whether or not the amount of the remaining supply will run out before the running job completes, the amount being sensed by the remaining amount sensor; and if it is judged the amount of the remaining supply will run out before the running job completes, the hardware processor suspends the running job then makes the image forming apparatus take the user assistance action.

31. The image forming apparatus according to claim 28, wherein: if the job has completed in a predetermined period, the hardware processor takes the user assistance action by the target member; if the job has not completed in a predetermined period, the hardware processor suspends the running job then takes the user assistance action by the target member.

32. The image forming apparatus according to claim 28, wherein, if any job in the queue will use the supply, the supply being in use by the running job, the hardware processor suspends the running job then takes the user assistance action.

33. The image forming apparatus according to claim 19, wherein:

whether or not the user assistance action is performed for each user is associated in advance in the user assistance lookup table;

there is a user identification portion that identifies the user carrying the belonging, the user identification portion being provided inside or outside of the image forming apparatus; and the hardware processor further judges whether or not to take the user assistance action with reference to the user and the user assistance lookup table, the user being identified by the user identification portion.

34. The image forming apparatus according to claim 19, wherein:
 there is a user identification portion that identifies the user carrying the belonging, the user identification portion being provided inside or outside of the image forming apparatus; and
 if the user identified by the user identification portion is not the user having created the running job, the hardware processor allows the running job to complete then takes the user assistance action.

35. The image forming apparatus according to claim 19, wherein:
 there is a range and location sensor that senses either or both of the range to and location of the user carrying the belonging, the range and location sensor being inside or outside of the image forming apparatus; and
 the hardware processor takes the user assistance action either or both of in a different manner and to a different extent depending on either or both of the range and location obtained by the range and location sensor.

36. The image forming apparatus according to claim 19, wherein:
 analysis is performed on the image obtained by the imaging portion and bodily information of the user is obtained; and
 the hardware processor takes another user assistance action than the user assistance action, the another user assistance action being associated with the bodily information of the user.

37. The image forming apparatus according to claim 36, further comprising either or both of the imaging portion and a body analyzer that obtains the bodily information of the user.

38. The image forming apparatus according to claim 36, further comprising an operation panel, wherein:
 the bodily information of the user is either or both of the locations of the user's face and hand; and
 the another user assistance action is adjusting either or both of the height and angle of the operation panel with reference to either or both of the locations of the user's face and hand.

39. A non-transitory computer-readable recording medium storing a user assistance program for a computer of an image forming apparatus to execute processing, wherein:
 analysis is performed on an image of a user being adjacent to the image forming apparatus, the image being obtained by an imaging portion, and a belonging of the user is identified; and
 there is a memory inside or outside of the image forming apparatus, the memory storing a user assistance lookup table, the user assistance lookup table including the following pieces of information associated with one another in advance: a belonging of a user; a user assistance action, the user assistance action being a mechanical operation; and a target member of the image forming apparatus to be affected by the user assistance action,
 the user assistance program for the computer executing processing comprising:
 retrieving a user assistance action and target member both associated with the identified belonging, by searching the user assistance lookup table for a record associated with the identified belonging; and
 performing the retrieved user assistance action by the retrieved target member.

40. The non-transitory computer-readable recording medium according to claim 39, storing the user assistance program, wherein analysis is performed on the image obtained by the imaging portion and bodily information of the user is obtained, the user assistance program for the computer to execute taking another user assistance action than the user assistance action, the another user assistance action being associated with the bodily information.

* * * * *